(12) United States Patent
Lelaure et al.

(10) Patent No.: US 6,640,314 B1
(45) Date of Patent: Oct. 28, 2003

(54) REDUNDANT AUTOMATION SYSTEM

(75) Inventors: Eric Lelaure, Claix (FR); Michel Meriaux, Varces (FR)

(73) Assignee: Schneider Automation, Valbonne (FR)

( * ) Notice: Subject to any disclaimer, the term of this patent is extended or adjusted under 35 U.S.C. 154(b) by 0 days.

(21) Appl. No.: 09/453,532

(22) Filed: Dec. 3, 1999

(30) Foreign Application Priority Data

Dec. 4, 1998 (FR) .............................................. 98 15385

(51) Int. Cl.$^7$ ................................................ G06F 11/00
(52) U.S. Cl. .......................................... 714/11; 714/10
(58) Field of Search .......................... 714/4, 9, 10, 11, 714/53

(56) References Cited

U.S. PATENT DOCUMENTS

| | | | | |
|---|---|---|---|---|
| 5,148,433 A | * | 9/1992 | Johnson et al. ................ | 714/10 |
| 6,047,222 A | * | 4/2000 | Burns et al. .................... | 700/79 |
| 6,108,300 A | * | 8/2000 | Coile et al. .................... | 370/217 |
| 6,148,410 A | * | 11/2000 | Baskey et al. .................. | 714/4 |
| 6,275,953 B1 | * | 8/2001 | Vahalia et al. ................. | 714/11 |

FOREIGN PATENT DOCUMENTS

| | | |
|---|---|---|
| DE | 195 48 445 | 7/1997 |
| EP | 0 754 991 | 1/1997 |
| EP | 0 788 039 | 8/1997 |

* cited by examiner

Primary Examiner—Nadeem Iqbal
Assistant Examiner—Timothy M. Bonura
(74) Attorney, Agent, or Firm—Oblon, Spivak, McClelland, Maier & Neustadt, P.C.

(57) ABSTRACT

A redundant automation system including a set of redundant PLCs including of a pair of PLCs each equipped with two communication couplers. The first coupler in the first PLC is connected to the first coupler in the second PLC through a first Ethernet network and the second coupler in the first PLC is connected to the second coupler in the second PLC through a second Ethernet network, connecting them to at least one remote equipment. Each of the PLCs has a hardware address and an IP address, the set of redundant PLCs being accessible from outside by a single IP address assigned to a first normal PLC, and a switching mechanism assigns the address related to normal operation to the second PLC, the IP address of the standby operation being assigned to the first PLC.

7 Claims, 1 Drawing Sheet

REDUNDANT AUTOMATION SYSTEM

BACKGROUND OF THE INVENTION

This invention relates to a redundant automation system comprising a set of redundant PLCs composed of a pair of PLCs each equipped with two communication couplers, the first coupler in the first PLC being connected to the first coupler in the second PLC through a first Ethernet network, the second coupler in the first PLC being connected to the second coupler in the second PLC through a second Ethernet network connecting them to at least one remote equipment.

In order to guarantee operating availability of some processes, it is necessary to use a redundant automation system composed of two conventional PLCs. With reference to FIG. 1, each programmable logic controller AP-A or AP-B comprises two communication couplers CC1-A or CC1-B and CC2-A or CC2-B. The two couplers CC1-A and CC1-B are connected to each other through an ETHERNET type network BE1 to ensure that the processing carried out on each is consistent. The other two couplers CC2-A and CC2-B are connected to the other ETHERNET type network BE2 and enable the redundant automation system to communicate with third party equipment. These PLCs AP-A and AP-B each receive signals from sensors C on the input channels of couplers CA-A and CA-B or send control signals to the control devices in the automated installation.

SUMMARY OF THE INVENTION

The purpose of this invention is to provide a redundant automation system operating under the TCP/IP protocol. The redundant system is accessed through a unique IP address, the system being seen like a singular PLC. No specific modification has to be made to applications running on third party equipment. When switching takes place between PLCs within the redundant system following an operating problem, it occurs very quickly and therefore loss of communication with third party equipment is minimized, or is even imperceptible.

The automation system according to the invention is characterized by the fact that each of the PLCs has a hardware address and an IP address, all redundant PLCs being accessible from outside through a single IP address assigned to a first "normal" PLC, while a switching mechanism assigns the address related to normal operation to the second PLC, the standby operation IP address being assigned to the first PLC.

According to one characteristic, each remote equipment that dialogs with the set of PLCs comprises a pair consisting of the IP address and the hardware address, in a cache memory for each PLC.

According to one characteristic, when switching takes place, existing connections with the pair of addresses are closed and connections are re-opened with the new pair of addresses.

According to another characteristic, each coupler periodically sends a "free ARP" request on the network, that enables any remote equipment connected to the network to take account of any change in the IP address/hardware address pair due to switching of the system.

BRIEF DESCRIPTION OF THE DRAWINGS

The invention will now be described in more detail with reference to an embodiment given as an example and illustrated by the attached drawings in which.

DETAILED DESCRIPTION OF THE PREFERRED EMBODIMENTS

Figure 1:
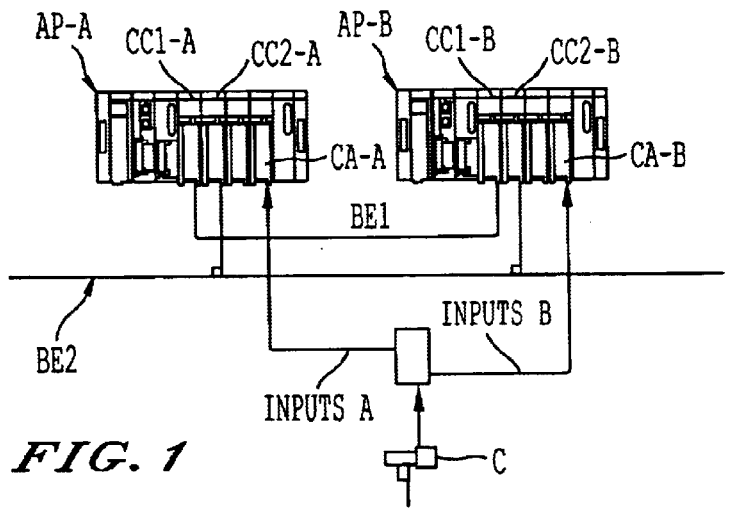
FIG. 1 is a diagram of a safety programmable logic controller according to the invention.

The set of redundant PLCs denoted AR as a whole, is composed of two strictly identical PLCs AP-A and AP-B. Each programmable logic controller AP-A and AP-B has two communication couplers CC1-A and CC1-B and CC2-A and CC2-B. The two couplers CC2-A and CC2-B are connected to the Ethernet type bus BE2 to enable communication with remote equipment S, itself connected to the Ethernet network, using the TCP/IP protocol. This remote equipment S may be a supervisor or another communication coupler. There is no limit to the number of items of remote equipment that are coupled to couplers CC2-A and CC2-B.

Input signals are sent to analog couplers CA-A or CA-B respectively, in which physical sampling is applied to them in order to digitize them, together with a PLC sampling corresponding to the customer application processing rate.

Any equipment connected to the Ethernet TCP/IP network BE2 such as a communication coupler CC2-A or CC2-B or third party equipment such as S, has a "MAC" address that is unique and is used to identify this equipment physically or materially on the network. It is used by the physical layer of the communication protocol. Another address, called the IP address, is assigned independently of the "MAC" hardware address and uniquely identifies the application that is running on the equipment in the physical sense of the term. This IP address is used by TCP/IP layers in the communication protocol. Applications that dialog with each other use IP addresses only and the network software must convert any IP address into a "MAC" physical or hardware address.

Each of these couplers implements a TCP/IP protocol stack supplied by the real time operating system of this coupler.

For each equipment, the link between the IP address and the "MAC" address has to be made and this is done using a protocol called ARP (Address Resolution Protocol). This protocol keeps a correspondence table between the IP address and the "MAC" address up to date. An equipment uses the ARP protocol to determine the physical address by distributing an ARP recognition request that contains the IP address to be translated. The equipment possessing the IP address concerned replies by sending its physical address. This protocol is stored in a cache memory of the equipment.

If an equipment does not know the "MAC" address of the remote equipment with which it wants to dialog, it firstly sends an ARP recognition request on the network for the "MAC" address in question. This request will be used to update the ARP protocol for the equipment and to make the link between the IP address and the "MAC" address. Since the "MAC" addresses recognition request is distributed on the network, the ARP cache in any equipment connected to the network is also updated.

Furthermore, any application that is running on a given equipment, can inform all equipment connected on the network about the value of its address pair (@MAC/@IP). This information is made by distributing a "free ARP" frame on the network. This distribution automatically updates ARP caches in all connected equipment.

Each of the PLCs AP-A and AP-B can be in a "normal" operating state or a "standby" state. For example, AP-A in the "normal" state may control the process and communicate with the remote equipment. In this case, the other PLC, AP-B, is in the "standby" state and is ready to take over from the associated "normal" PLC AP-A if a problem occurs. The two PLCs AP-A and AP-B are never in the same operating state at the same time. An election mechanism is used to determine which PLC will act as "normal", the second associated PLC in the system then being in the "standby" state. This changeover to the "normal" state from one PLC to another is called "switching" of the redundant system.

The set of redundant PLCs is seen by any external equipment as being a single PLC and it is therefore known and accessible by applications running on remote equipment using a single IP address denoted @IPn.

Figure 2:
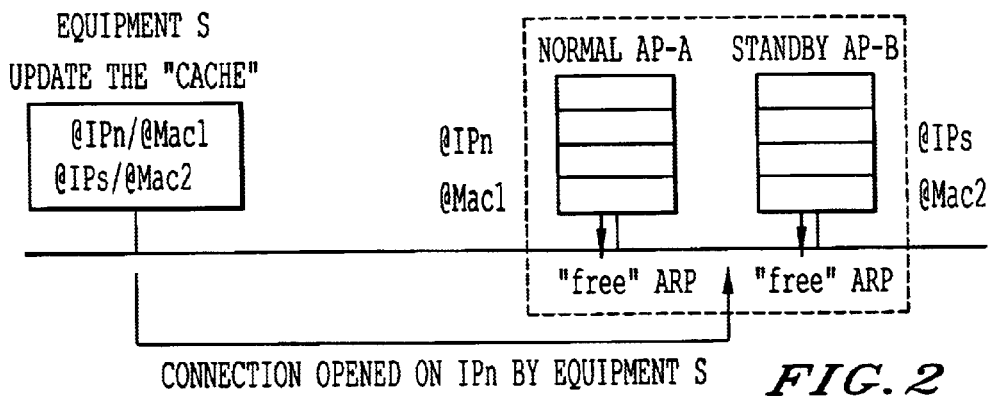
FIG. 2 is a diagram of the communication mechanism between the third party equipment and the PLCs in the redundant system.

With reference to FIG. 2, the PLC AP-A that is in the "normal" state has a hardware address @MAC1 and an IP address denoted @IPn. PLC AP-B which is in the "standby" state has a hardware address @MAC2 and an IP address denoted @IPs.

When a TCP/IP connection is set up between remote equipment S and the redundant PLC AR, the ARP cache for the remote equipment S contains the address pair @IPn and @MAC1.

After switching, the coupler CC2-B on PLC AP-B for which the hardware address is @MAC2 takes on the IP address @IPn by changing to the "Normal" state. The IP address of coupler CC2-A of PLC API-A for which the hardware address is @MAC1 then becomes @IPs, provided that it can do so depending on the failure.

After this switching has taken place, the "Normal" PLC is PLC AP-B which has hardware address @MAC2 and IP address @IPn. The "standby" PLC is PLC AP-A, for which the hardware address is @MAC2 and the IP address is @IPs. The remote equipment S that communicates with the redundant automation system dialogs with the new @IPn/@MAC2 pair.

During switching, existing connections with the @IPn/@MAC1 pair are closed, and connections are re-opened with the new @IPn/@MAC2 pair. These two operations are carried out quickly without any change to the application running on the remote equipment.

Figure 3:
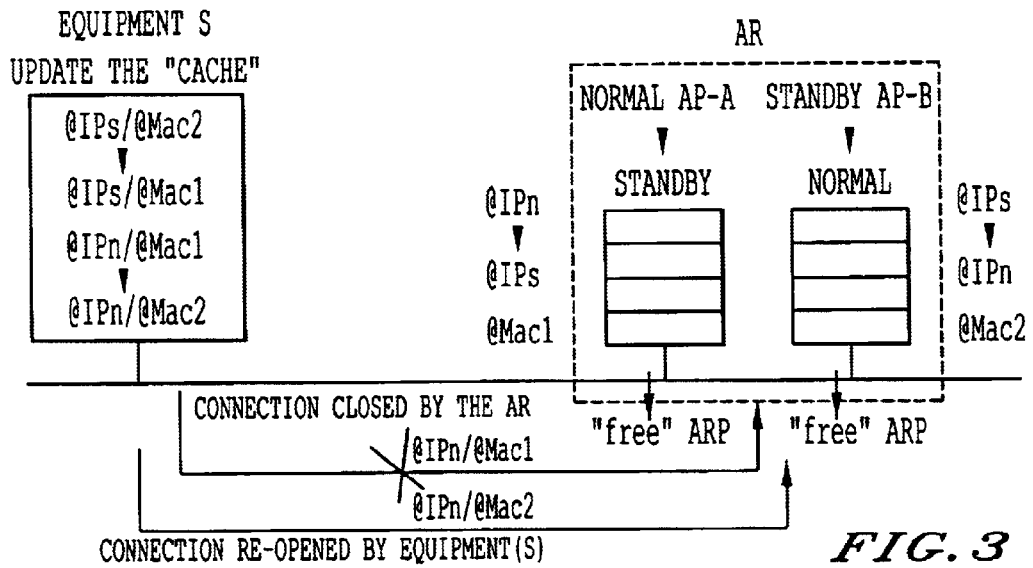
FIG. 3 is a diagram showing the switching mechanism between PLCs in the redundant system.

The operation of the system will now be explained with reference to FIGS. 2 and 3.

In the initial state (FIG. 2), the "normal" PLC is AP-A that has addresses @IPn/@MAC1 and the "standby" PLC AP-B has addresses @IPs/@MAC2.

After switching, in the final state, the "normal" PLC is AP-B that has addresses @IPn/@MAC2, and the "standby" PLC is AP-A that has addresses @IPs/@MAC1. Therefore, the @IPn/@MAC1 pair was immediately replaced by the @IPn/@MAC2 pair in the ARP cache of the remote equipment S.

When PLC AP-B, that has become "normal", has sent the "free ARP" request, it informs all other equipment connected to the network about the new address pair @IPn/@MAC2.

When a new connection request is made for a previously connected remote application, the previous connection is destroyed.

The intervals at which the ARP request is sent are sufficiently short to deal with all switching cases combined with a communication problem on the network (for example cable break).

Obviously, it would be possible to imagine variants and detailed improvements, or even to envisage the use of equivalent means, without going outside the scope of the invention.

What is claimed is:

1. Redundant automation system comprising:
    a set of redundant PLCs, said set including a pair of PLCs each equipped with first and second communication couplers, the first coupler in the first PLC being connected to the first coupler in the second PLC through a first Ethernet network, the second coupler in the first PLC being connected to the second coupler in the second PLC through a second Ethernet network, connecting the pair of PLCs to at least one remote equipment,
    wherein each of the pair of PLCs has a hardware address and an IP address, the set of redundant PLCs being accessible from the outside only by a single IP address assigned to a first PLC, wherein a switching mechanism assigns the address related to normal operation to the second PLC, the IP address of the standby operation being assigned to the first PLC.

2. System according to claim 1, wherein each remote equipment in dialog with the set of PLCs comprises a pair in its cache memory for each PLC formed by the IP address and the hardware address.

3. System according to claim 1, wherein during switching the current connections with the pair of addresses are closed, and the connections are re-open with the new address pair.

4. System according to claim 1, wherein each coupler periodically sends a free ARP request on the network that is used by any remote equipment connected to the network to take account of any change in the IP address/hardware address pair due to system switching.

5. System according to claim 2, wherein during switching the current connections with the pair of addresses are closed, and the connections are re-open with the new address pair.

6. System according to claim 2, wherein each coupler periodically sends a free ARP request on the network that is used by any remote equipment connected to the network to take account of any change in the IP address/hardware address pair due to system switching.

7. Redundant automation system comprising:
    a set of redundant (PLCs), said set including a pair of PLCs each equipped with first and second communication couplers, the first coupler in the first PLC being connected to the first coupler in the second PLC through a first Ethernet network, the second coupler in the first PLC being connected to the second coupler in the second PLC through a second Ethernet network, connecting the pair of PLCs to at least one remote equipment,
    wherein each of the pair of PLCs has a hardware address and an IP address, the set of redundant PLCs being accessible from outside by a single IP address assigned to a first PLC, and IP wherein a switching mechanism assigns the address related to normal operation to the second PLC, the IP address of the standby operation being assigned to the first PLC; and
    wherein each remote equipment in dialog with the set of PLCs comprises a pair in its cache memory for each PLC formed by the IP address and the hardware address wherein said pair sends a first Address Resolution Protocol (ARP) message to said at least one remote equipment.

* * * * *